United States Patent [19]

Chen

[11] Patent Number: 5,925,395
[45] Date of Patent: Jul. 20, 1999

[54] METHODS FOR PRESERVING FRESH VEGETABLES

[75] Inventor: Chao Chen, Shrewsbury, Mass.

[73] Assignee: Mantrose-Haeuser Co., Inc., Attleboro, Mass.

[21] Appl. No.: 09/005,340

[22] Filed: Jan. 9, 1998

[51] Int. Cl.⁶ ..................... A23B 7/153; A23L 3/3454
[52] U.S. Cl. ..................... 426/321; 426/302; 426/310; 426/327; 426/442
[58] Field of Search ..................... 426/262, 267, 426/268, 270, 302, 310, 321, 327, 331, 541, 442

[56] References Cited

U.S. PATENT DOCUMENTS

| | | | |
|---|---|---|---|
| 3,754,938 | 8/1973 | Ponting | 426/321 |
| 4,006,257 | 2/1977 | Kolk | 426/269 |
| 4,011,348 | 3/1977 | Farrier et al. | 426/268 |
| 4,818,549 | 4/1989 | Steiner et al. | 426/267 |
| 4,882,190 | 11/1989 | Olson et al. | 426/541 |
| 4,960,600 | 10/1990 | Kester et al. | 426/310 |
| 4,988,522 | 1/1991 | Warren | 426/268 |
| 5,055,313 | 10/1991 | Warren | 426/268 |
| 5,126,153 | 6/1992 | Beck | 426/269 |
| 5,198,254 | 3/1993 | Nisporos-Carriedo et al. | 426/102 |
| 5,376,391 | 12/1994 | Nisporos-Carriedo et al. | 426/102 |
| 5,389,389 | 2/1995 | Beck | 426/269 |

FOREIGN PATENT DOCUMENTS

WO 97/23138   7/1997   WIPO.

OTHER PUBLICATIONS

Pathamanaban, G. et al., "Postharvest Preservation of Vegetables Using Fused Calcium Salts", Madras Agric. J., vol. 81, No. 8, pp. 460–461, 1994.
Izumi, H. et al., "Calcium Treatment to Maintain Quality of Zucchini Squash Slices", Journal of Food Science, vol. 60, No. 4, pp. 789–793, 1995.
"Calcium Alginate Films: Thermal Properties and Permeability to Sorbate and Ascorbate" by wong, et al. *Journal of Food Science*, vol. 61, No. 2, 1996, pp. 337–341.
"Gas Exchange in Cut Apples with Bilayer Coatings" by Wong, et al., *Agricultural and Food Chemistry*, Oct. 1994, pp. 2278–2285.
"Development of Edible Coatings for Minimally Processed Fruits and Vegetables" by Wong, et al., *Edible Coatings and Films to Improve Food Quality*, Editors Krochta, et al., 1994 (Chapter 3).
Abstract No. 65 for "Treatment for Sliced Avocados to Reduce Discoloration", Camirand, et al., 1994 Western Regional ACS Meeting and Pacific Conference, Oct. 19–22, 1994.

"Reporting Of Objective Color Measurements" by McGuire, *HortScience*, vol. 27(12), Dec. 1992, pp. 1254–1255.
"Heated Ascorbic/Citric Acid Solution as Browning Inhibitor for Pre–Peeled Potatoes" by Sapers, et al., *Journal of Food Science*, vol. 60, No. 4, 1995, pp. 762–776.
"New Approaches in Improving the Shelf Life of Minimally Processed Fruit and Vegetables" by Ahvenainen, *Trends in Food Science and Technology*, Jun. 1996, vol. 7, pp. 179–187.
"Color of Minimally Processed Potatoes as Affected by Modified Atmosphere Packaging and Antibrowning Agents" by Gunes, et al., *Journal of Food Science*, vol. 62, No. 3, 1997, pp. 572–575.
"Control of Enzymatic Browning in Apple with Ascorbic Acid Derivatives, Polyphenol Oxidase Inhibitors, and Complexing Agents" by Sapers, et al., *Journal of Food Science*, vol. 54, No. 4, 1989, pp. 997–1002.
"Inhibition of Apple Polyphenoloxidase (PPO) by Ascorbic Acid, Citric Acid and Sodium Chloride" by Pizzocaro, et al., *Journal of Foor Processing and Preservation*, 17 (1993) pp. 21–30.
"Inhibition of Enzymatic Browning in Apple Products by 4–Hexylresorcinol" by Monsalve–Gonzalez, et al., *Food Technology*; vol. 49, No. 4, Apr. 1995, pp. 110–117.
"Control of Browning During Storage of Apple Slices Preserved by Combined Methods. 4–Hexylresorcinol as Anti–Browning Agent" by Monsalve–Gonzalez, et al.,*Journal of Food Science*, vol. 58, No. 4, 1993, pp. 797–826.
"Enzymatic Browning Inhibited in Fresh and Dried Apple Rings by Pineapple Juice" by Lozano–de–Gonzalez, et al., *Journal of Food Science*, vol. 58, No. 2, 1993, pp. 399–404.

Primary Examiner—Milton Cano
Attorney, Agent, or Firm—Calfee, Halter & Griswold LLP

[57] ABSTRACT

Methods of preserving fresh vegetables with a vegetable preservative which extends the shelf life of fresh vegetables, particularly cut fresh vegetables, are provided. The vegetable preservative preserves the texture, flavor, appearance, crispness, and moisture of the fresh vegetables, particularly fresh cut vegetables. In the preferred embodiment, the method comprises the following steps: providing a preservative solution comprising: water, calcium ions; and ascorbate ions, and, applying the vegetable preservative to the vegetable. The vegetable preservative solution contains preferably from about 0.075% to a saturated solution, more preferably from about 0.2% to about 20%, even more preferably from about 0.5% to about 10%, even more preferably from about 0.5% to about 8% most preferably from about 0.6% to about 5%, by weight, calcium salt; and preferably from about 0% to about 30%, more preferably from about 0.1% to about 30%, even more preferably from about 0.5% to about 15%, most preferably from about 1.0% to about 5%, by weight, ascorbic acid or the stereo isomer of ascorbic acid, erythorbic acid.

19 Claims, No Drawings

METHODS FOR PRESERVING FRESH VEGETABLES

BACKGROUND OF THE INVENTION

Fresh vegetables rapidly deteriorate particularly when the flesh of the vegetable is exposed, such as by peeling the skin or by cutting the vegetable. The appearance, flavor, texture, and crispness rapidly degrades; the vegetable becomes soft and loses its characteristic crispness. Once vegetables are cut, they typically loose luster; often the vegetables develop a whitish cast. Many cut vegetables, such as cut peppers, once stored in a sealed package, typically exude water which collects in the package.

Methods of preservation such as freezing substantially preserves flavor; however texture and crispness are affected. Furthermore, frozen foods need to be continually stored and require freezers for storage. Refrigeration helps to preserve crispness texture and flavor for a limited number of hours. Cooking, drying and dehydration radically alter the texture, flavor appearance and texture of a vegetable. Chemical preservatives typically leave a residual taste and/or do not maintain the characteristic appearance, texture, flavor or moisture of the fresh cut vegetable. Certain chemical preservatives such as sulfites have come under scrutiny as having negative health risks.

It would be desirable to have a method for preserving fresh vegetables, particularly cut vegetables, which preserves the appearance, texture, crispness, flavor and moisture and, yet does not require cooking, drying or freezing.

SUMMARY OF THE INVENTION

The present invention pertains to methods of preserving fresh vegetables with a vegetable preservative which extends the shelf life of fresh vegetables, particularly cut fresh vegetables. The vegetable preservative preserves the texture, flavor, appearance, crispness, and moisture of the fresh vegetables, particularly fresh cut vegetables, without drying or dehydrating the vegetables and without employing sulfites. The method comprises the following steps: providing a preservative solution comprising: water, calcium ions; and preferably ascorbate ions, and, applying said vegetable preservative to the vegetable.

The vegetable preservative solution contains preferably from about 0.075% to a saturated solution, more preferably from about 0.2% to about 20%, even more preferably from about 0.5% to about 10%, even more preferably from about 0.5% to about 8% most preferably from about 0.6% to about 3%, by weight, calcium salt; and preferably from about 0% to about 30%, more preferably from about 0.1% to about 30%, even more preferably from about 0.5% to about 15%, most preferably from about 1.0% to about 5%, by weight, ascorbic acid or the stereo isomer of ascorbic acid, erythorbic acid.

Preferably the vegetable is then stored at a temperature which will not freeze the vegetable. Preferably the vegetable is stored at temperatures of between about 0° C. to room temperature, about 20° C., more preferably about 1° C. to about 7° C., most preferably from about 2° C. to about 5° C. The invention also relates to fresh vegetables preserved with the vegetable preservatives.

DETAILED DESCRIPTION OF THE INVENTION

The present invention pertains to methods of preserving fresh, that is, uncooked, vegetables with a vegetable preservative which extends the shelf life of the fresh vegetable, particularly cut fresh vegetable. The vegetable preservative preserves the texture, flavor, appearance, crispness, color of vegetables, particularly the following vegetable families: the Solcanaceae family, for example potatoes, peppers, eggplants and tomatoes; the Amaryllidaceae family such as onions; and the Brassicaceae family, for example cabbage; and the Cucurbitaceae family, for example cucumbers. The vegetable preservative also preserves edible fungi of the Ascomycetes/Basidiomycetes classes, such as edible mushrooms, although for less extended periods, typically about 4 days. Unless other wise noted, the term "vegetable" shall include the edible fungi in addition to the conventional vegetables.

In one embodiment, the method comprises first providing a solution of vegetable preservative comprising: water, calcium ions; and preferably ascorbate ions. Next, the vegetable preservative is applied to the vegetable. The vegetable preservative is applied using conventional techniques preferably for a time sufficient to coat the vegetable with the vegetable preservative. Suitable techniques are spraying, sprinkling and dipping. Preferably the vegetable is then stored below about 20° C. at a temperature which will not freeze the vegetable.

Preferably the vegetable is stored at temperatures of between about 0° C. to room temperature, about 20° C., more preferably about −1° C. to 7° C., most preferably from about 2° C. to 5° C. Vegetables preserved with vegetable preservative which is stored at room temperature will maintain appearance, flavor, texture and taste, however, after extended periods may have a microbial content that is not desirable.

The preservative maintains the freshness, crispness, texture, appearance, color and moisture and flavor of the vegetable. The length of the period of preservation depends upon the initial vegetable quality, the species and the variety of the vegetable and growing conditions of the vegetable. However the method of the present invention extends the period in which a vegetable has the appearance, moistness, texture, flavor and taste characteristic of the freshly cut vegetable, typically up to about 10 to about 16 days.

The method of the present invention offers the advantage in that the preserved vegetable may be stored under standard atmospheric pressure and standard atmospheric conditions; that is, the method does not require that the vegetable be stored under vacuum or inert atmosphere. The method offers the advantage in that it does not require preservatives such as sulfites. The method of preserving vegetable does not require that the food be cooked, dried or frozen. However, after the vegetable is preserved with the vegetable preservative, it may be dried or freeze dried for use as for example food or potpourri. The preserved vegetables, particularly the cut vegetables, do not release substantial amounts of water; thus the sliced vegetable retains its characteristic moisture, and water tends not to pool in the packages as is typically seen with conventional cut vegetables. An additional advantage of the preserved vegetables not releasing water is that they are suitable for placing directly on other food products such as, for example, a pizza.

The Vegetable Preservative

The vegetable preservative is preferably a solution, which contains water and calcium ions and preferably either ascorbate ions or erythorbate ions or mixtures thereof. The source of the calcium ion is preferably a calcium hydroxide or a calcium salt or a mixture thereof. Suitable calcium salts are, for example, calcium chloride, calcium carbonate, calcium phosphate, calcium erythorbate, calcium acetate, calcium gluconate, calcium glycerophosphate, calcium lactate, calcium ascorbate and mixtures thereof. The source of the ascorbate ion is ascorbic acid, erythorbic acid, or an ascorbate or erythorbate salt such as calcium ascorbate or calcium erythorbate. Where calcium ascorbate is employed, it is the source for both the calcium ion and the ascorbate ion. When added to water the ascorbic acid disassociates at least partially into the ascorbate ion and a hydrogen ion; the calcium salt disassociates into the calcium ion and the corresponding anion. Where the calcium ascorbate is employed the vegetable preservative may also be used in the dry form; in the dry form the vegetable preservative is preferably powdered or granular.

The percentage of the "dry" ingredients, exclusive of water, in the vegetable preservative are: preferably from about 10% to about 100%, more preferably from about 20% to about 50%, most preferably from about 25% to about 40% of a calcium salt; where the calcium salt is a salt other than calcium ascorbate or calcium erythorbate, there is from about 30% to about 90%, more preferably from about 50% to about 80%, most preferably from about 60% to about 75% ascorbic acid. Where the calcium salt is calcium ascorbate or calcium erythorbate, ascorbic acid is not necessary and is not preferred. Where the calcium salt is calcium chloride, the percentage of the dry ingredients exclusive of water, in the vegetable preservative is preferably from about 20% to about 90%, more preferably from about 30% to about 80%, most preferably from about 40% to about 70%, ascorbic acid and from about 10% to about 80%, more preferably from about 20% to about 70%, most preferably from about 25% to about 40%, calcium chloride. Where the calcium salt is calcium carbonate, the percentage of dry ingredients, in the vegetable preservative is preferably from about 70% to about 90%, more preferably from about 75% to about 85%, most preferably from about 77% to about 80%, ascorbic acid and from about 10% to about 30%, more preferably from about 15% to about 25%, most preferably from about 20% to about 23%, calcium carbonate.

Preferably the dry ingredients are mixed together to form a dry mixture which is then added to water to form the vegetable preservative solution. Preferably the vegetable preservative solution is used shortly, within hours, after being prepared.

The vegetable preservative solution contains preferably from about 0.075% to a saturated solution, more preferably from about 0.2% to about 20%, even more preferably from about 0.5% to about 10%, even more preferably from about 0.5% to about 8% most preferably from about 0.6% to about 5%, by weight, calcium salt; and preferably from about 0% to about 30%, more preferably from about 0.1% to about 30%, even more preferably from about 0.5% to about 15%, most preferably from about 1.0% to about 5%, by weight, ascorbic acid or the stereo isomer of ascorbic acid, erythorbic acid.

The vegetable preservative solution preferably has an ion or mole ratio of ascorbate ion to calcium ion, or ascorbate acid to calcium salt, of from about 0.2:1 to about 9:1, more preferably from about 0.5:1 to about 4:1, most preferably about 1:1 to about 2.5:1. The vegetable preservative solution preferably has a weight ratio of ascorbate ion to calcium ion, of from about 0.5:1 to about 10:1, more preferably from about 2:1 to about 9:1, most preferably about 5:1 to about 8:1.

The concentration of ascorbate ions is from about 0% to about 30%, preferably from about 0.1% to about 30%, more preferably from about 0.1 to about 20%, even more preferably from about 0.5% to about 15%, most preferably from about 1% to about 5%, and the concentration of calcium ions is preferably from about 0.02% to about 15%, more preferably from about 0.1% to about 10%, most preferably from about 0.2% to about 3%.

The pH range of the vegetable preservative solution is preferably from about 2 to about 10, more preferably from about 3 to about 8, most preferably from about 3.5 to about 7.5. The pH is adjusted if needed with conventional bases such as for example, sodium hydroxide or calcium hydroxide.

Preferably the vegetable preservative lacks citric acid, acetic acid and other acids, with the exception of ascorbic acid and erythorbic acid. For the best taste, the vegetable preservative solution preferably does not have a chloride ion concentration greater than about 5%, more preferably not greater than about 2%, even more preferably not greater than about 1.5%, preferably not greater than about 0.5%; the chloride concentration of the vegetable preservative ingredients, excluding water, is preferably not greater than about 35%, preferably not greater than about 13%. Similarly, for the best taste, the vegetable preservative solution preferably does not have a sodium ion concentration greater than about 2%; more preferably not greater than about 1%; the sodium concentration of the vegetable preservative ingredients, excluding water, is preferably not greater than about 10%, more preferably not greater than about 5%.

Again, for the best taste, the vegetable preservative preferably lacks a metal ion sequestrant particularly an acidic polyphosphate metal ion sequestrant or chelant or is essentially free of a metal ion sequestrant. "Essentially free" means that the vegetable preservative has at most than trace amounts; of impurities of metal ion sequestrant, for example, less than 0.5% of the ingredients exclusive of the water.

It is also preferred that the vegetable preservative lack agents which affect the 'mouth feel" of the cut vegetable and impart a waxy or slippery feel to the vegetable, such as gelling agents, film forming agents, waxes, gums, polysaccharides, such as hydroxymethyl cellulose, methyl cellulose, microcrystalline cellulose, alginates, carrageenans, lipids, pectins, modified starches, locust bean gum, xanthum gum, gellan gum, guar gum, and tragacaths.

It is also preferred that the vegetable preservative lack lecithin and emulsifiers proteins as well as individual amino acids, such as cysteine, more specifically L-cysteine.

The Method of Preserving Vegetable with the Vegetable Preservative

The vegetable is preferably first sanitized to reduce or eliminate microorganisms on the surface of the vegetable skin. Good results have been obtained using a 50–100 ppm sodium hypochlorite solution. The vegetable is then processed such as for example, by paring, slicing, coring, dicing, peeling or a combination thereof; preferably sanitized again and then the vegetable preservative is applied. The vegetable preservative, preferably ambient temperature, is applied by conventional techniques such as spraying, dipping, sprinkling tossing, immersing or drenching. Dipping involves immersing the vegetable into a solution of vegetable preservative and is generally preferred. Good results have been obtained by dipping vegetable about 1–2 minutes. Longer dipping times are also employed. Subsequent dipping with film forming agents is not necessary and is not preferred.

The vegetables are then preferably placed in conventional packaging to prevent or reduce drying of the vegetable, if the vegetable is not to be consumed within several hours, such as vegetable is to be transported or is to be displayed on a shelf. However, where the vegetable is to be consumed with several hours from slicing or peeling, the vegetable is preferably not packaged. Suitable packaging includes for example, polyethylene bags, polystyrene "clam shell" packages, multi-layer polyolefin bags such as Food Saver bags, Cryovac PD900, or Cryovac B900, bag from Cryovac Inc. Preferably the vegetable is stored at below 25° C., even more preferably below 7° C., even more preferably below 5° C., to reduce microbial growth. While the vegetable may be stored at ambient temperatures around 20° C., shelf life is increased by storing below 20° C. preferably below 7° C. The vegetable is preferably stored above 0° C. to prevent freezing.

Preferably the packaged vegetable is not stored in a specialized atmosphere such as an atmosphere containing increased carbon dioxide or reduced oxygen; an advantage of the present method is that the vegetables are preserved even when stored in ambient air at standard atmospheric pressure.

Evaluation of Preserved Vegetables

As a result of being preserved with vegetable preservative, the vegetables retain their fresh cut characteristics, particularly vegetables retain a substantial portion of their moisture content. Vegetables preserved with the vegetable preservative typically maintain greater than about 90% of their original moisture at 12 days, even 14 days as compared fresh sliced vegetables. Appearance was also evaluated; non-preserved vegetables typically lose gloss, become whitish and lose natural color.

The texture, flavor, and moistness of the vegetable were evaluated by tasting vegetable samples. Appearance was also evaluated by visual inspection. The appearance, texture, moistness and flavor were then evaluated according to a scale of either 1 to 10, with 10 being the value assigned to a freshly cut piece of comparative vegetable.

Methods of Preserving Fresh Vegetable Using the Vegetable Preservative

EXAMPLE 1

Whole green bell peppers were washed, cored, deseeded, and sliced. The pepper slices were then dipped into the solutions listed in Table 1 for one minute. After removal from the solution, the peppers were drained for about five minutes. The pepper slices were sealed in Cryovac PD900 bags, (200 g of sliced peppers in a 8"×5" bag) and stored at 2–5° C. for 14 days. The results are shown in Table 1.

TABLE 1

Evaluation of Sliced Green Bell Peppers Preserved With Various Preservation Solutions

| Preservative Solution | Appearance | | Flavor | | Texture | |
|---|---|---|---|---|---|---|
| | 10 days | 14 days | 10 days | 14 days | 10 days | 14 days |
| 2.48% ascorbic acid, 1.04% calcium chloride 0.26% sodium hydroxide pH 4.05 | 10 | 9 | 10 | 7 | 10 | 7 |
| 2.48% ascorbic acid, 0.58% calcium chloride, and 0.31% calcium carbonate pH 4.03 | 10 | 8.5 | 9 | 8 | 8 | 7 |

TABLE 1-continued

Evaluation of Sliced Green Bell Peppers Preserved With Various Preservation Solutions

| Preservative Solution | Appearance | | Flavor | | Texture | |
|---|---|---|---|---|---|---|
| | 10 days | 14 days | 10 days | 14 days | 10 days | 14 days |
| 3.0% calcium ascorbate pH 7.55 | 10 | 7 | 10 | 5 | 10 | 6 |
| 1% ascorbic acid, 0.3% calcium chloride, and 0.21% sodium hydroxide pH 5.25 | 10 | 2 | 9 | / | 8 | / |
| 2.48% ascorbic acid, 1.5% calcium chloride, and 0.27% sodium hydroxide pH 4.03 | 10 | 8.5 | 10 | 8 | 10 | 7 |
| water | 10 | 2 | 9 | / | 7 | / |

*The scores for fresh cut were 10

As can be seen in Table 1, the vegetable preservative preserved the flavor, texture, and appearance of the vegetables even at 14 days.

EXAMPLE 2

Green bell peppers were preserved as in Example 1, except with different preservative solutions listed in Table 2. The pepper slices were stored at 2–5° C. for 11 days. The results are shown in Table 2.

TABLE 2

Evaluation of Sliced Green Bell Peppers Preserved with Different Solutions

| Preservative Solution | Appearance | Flavor | Texture |
|---|---|---|---|
| 2.48% ascorbic acid, 1.02% calcium chloride, and 0.26% sodium hydroxide pH 3.94 | 9 | 9 | 9 |
| 2.48% ascorbic acid, 0.58% calcium chloride, and 0.31% calcium carbonate pH 3.94 | 9 | 9 | 8 |
| 2.48% ascorbic acid, 1.5% calcium chloride, and 0.27% sodium hydroxide pH 3.90 | 9 | 9 | 7 |
| 2.48 ascorbic acid, 2.5% calcium chloride, and 0.296% sodium hydroxide pH 3.90 | 9 | 9 | 9 |
| water (control) | 7 | 7 | 6 |

*The scores for fresh cut were 10.

As can be seen in Table 2, the vegetable preservatives preserved the flavor, texture, and appearance of the vegetables as compared to the controls.

EXAMPLE 3

Whole Green bell peppers were washed and treated with 100 ppm sodium hypochlorite solution, then quartered, cored, deseeded, and sliced. The pepper slices were dipped into 50 ppm sodium hypochlorite solution for 30 seconds, then, drained and dried on paper towel for five minutes. A portion of the peppers were sealed in Cryovac PD900 bags as controls. The rest of the peppers were dipped into the preservative solutions listed in Table 3 for one minute. The peppers were drained and dried on paper towel for about five minutes. The pepper slices were sealed in Cryovac PD900 bags (200 g pepper slices in a 81"×5" bag) and stored at 2–5° C. for 13 days. The results are shown in Table 3.

TABLE 3

Evaluation of Sliced Green Bell Peppers Preserved With Various Preservatives Solutions

| Preservative Solution | Appearance | Flavor | Texture | Moistness |
|---|---|---|---|---|
| 2.48% ascorbic acid, 2.5% calcium chloride, and 0.296% sodium hydroxide pH 3.91 | 9 | 7 | 8 | 8 |
| 2.48% ascorbic acid, 1.02% calcium chloride, and 0.26% sodium hydroxide pH 3.96 | 9.5 | 9.5 | 9.5 | 9.5 |
| 2.48% ascorbic acid, 0.58% calcium chloride, and 0.31% calcium carbonate at pH 4.01 | 6 | / | / | / |
| 1% ascorbic acid, 2.5% calcium chloride, and 0.296% sodium hydroxide at pH 9.33 | 8 | '9.5 | 9.5 | 9.5 |
| 2.5% calcium chloride at pH 9.87 | 9.5 | 9 | 9 | 9.5 |
| 2.48 ascorbic acid, 0.71% calcium carbonate at pH 6.20 | 9.5 | 9 | 9 | 9.5 |
| Control | 3 | / | / | / |

*The scores for fresh cut were 10.

As can be seen in Table 3, the vegetable preservatives preserved the flavor, texture, appearance and moistness of the vegetables at 13 days.

EXAMPLE 4

Whole Green bell peppers were washed and treated with 100 ppm sodium hypochlorite solution, then quartered, cored, deseeded, and sliced. The pepper slices were then dipped into 100 ppm sodium hypochlorite solution for 30 seconds, then drained and dried on paper towel for about five minutes. A portion of the peppers were sealed in Cryovac PD900 bags as controls. The rest of the peppers were dipped into solution of 2.48% ascorbic acid, 1.02% calcium chloride, and 0.26% sodium hydroxide for one minute. The peppers were drained and dried on paper towel for about five minutes, then sealed in Cryovac PD900 bags (200 g pepper slices in a 8"×5" bag) and stored at 2–5° C., 10° C., and 25° C. The results are shown in Table 4.

TABLE 4

Sliced Green Bell Peppers at Different Storage Temperature

| Pepper Sample | Storage Temperature | Date of First Spoilage |
|---|---|---|
| preserved | 2–5° C. | 16 days |
| Control | | 11 days |
| preserved | 10° C. | 9 days |
| Control | | 7 days |

TABLE 4-continued

Sliced Green Bell Peppers at Different Storage Temperature

| Pepper Sample | Storage Temperature | Date of First Spoilage |
|---|---|---|
| preserved | 25° C. | 3 days |
| Control | | 2 days |

As can be seen in Table 4, the vegetable preservatives preserved the vegetables even at 16 days when stored at 2–5 C., as compared to 11 days in the control; 9 days when stored at 10 C. as compared to 7 days in the control; 3 days when stored at 25 C. as compared to 2 days in the control.

EXAMPLE 5

Orange peppers, long peppers, Italian Frying peppers, and Jalapeno peppers were preserved as described in Example 4 and they were stored at 2–5° C. The results are shown in Table 5.

TABLE 5

Preservation of Several Pepper Varieties

| Pepper | Appearance | | |
|---|---|---|---|
| Sample | 7 days | 10 days | 14 days |
| preserved orange peppers | 10 | 10 | 9 |
| control orange peppers | 9.5 | 8 | 7 |
| preserved long hot peppers | 10 | 10 | 5 |
| control long hot peppers | 10 | 8 | 5 |
| preserved Italian frying peppers | 10 | 9.5 | 9.5 |
| control Italian frying peppers | 10 | 9 | 5 |
| preserved Jalapeno peppers | 10 | 10 | 10 |
| control Jalapeno peppers | 9.5 | 9 | 9 |

*The scores for fresh cut were 10.

As can be seen in Table 5, the vegetable preservatives preserved the vegetables, and maintained better appearance than control peppers even at 14 days.

EXAMPLE 6

Peppers were preserved as in Example 4, except different temperature of preservative solutions were used and the peppers were stored at 2–5° C. The results are shown in Table 6.

TABLE 6

Effects of Different Temperatures of Preservative Solutions on Preserved of Vegetables

| Temperature of preservative | Pepper Appearance | | |
|---|---|---|---|
| solutions | 4 days | 11 days | 14 days |
| 2–5° C. | 10 | 9.5 | 9 |
| 10° C. | 10 | 9.5 | 9 |

TABLE 6-continued

Effects of Different Temperatures of Preservative Solutions on Preserved of Vegetables

| Temperature of preservative | Pepper Appearance | | |
|---|---|---|---|
| solutions | 4 days | 11 days | 14 days |
| 21° C. | 10 | 9.5 | 9 |
| Control | 10 | 7.5 | 5 |

*The scores for fresh cut were 10.

As can be seen in Table 6, the solution temperatures of vegetable preservatives did not affect the quality of preserved the vegetables and maintained better appearance than control.

EXAMPLE 7

Peppers were preserved as in Example 4, except the pepper slices were stored in open jars and stored at either 2–5° C. at 95% relative humidity or 25° C. at 34% relative humidity. The results are shown in Table 7.

TABLE 7

Evaluation of Preserved Sliced Green Bell Peppers Stored at Different Conditions

| Pepper Sample | Storage Conditions | Began drying at: |
|---|---|---|
| preserved | 2–5° C., 95% RH | 4 days |
| Control | | overnight (8–22 hours) |
| preserved | 25° C., 34% RH | overnight (8–22 hours) |
| control | | 2 hours |

As can be seen in Table 7, the vegetable preservatives preserved the vegetables and reduced dehydration as compared to the control vegetables.

EXAMPLE 8

Peppers were preserved as in Example 4, except the preservative solutions contained varying amounts of sodium hydroxide and had varying pH values as listed in Table 8. The samples were stored at 2–5° C. for 14 days. The results are shown in Table 8.

TABLE 8

Effects of pH of Preservative Solution on Preservation of Vegetables

| % of Sodium Hydroxide in the Preservative Solution | pH of the Preservative Solution | Appearance Rating | |
|---|---|---|---|
| | | 10 days | 14 days |
| 0 | 2.65 | 8.5 | 8.5 |
| 0.1 | 3.55 | 8 | 8 |
| 0.2 | 3.98 | 9 | 8.5 |
| 0.26 | 4.09 | 9.5 | 9.5 |
| 0.52 | 5.10 | 9 | 5 |
| 0.54 | 7.25 | 9.5 | 5 |
| 0.7 | 9.95 | 8.5 | 7.5 |
| Control | / | 7 | 3 |

*The scores for fresh cut were 10.

As can be seen in Table 8, the vegetable preservatives preserved the vegetables over a wide pH range even at 14 days, as compared to the control vegetables.

EXAMPLE 9

Peppers were preserved as in Example 4, except the preservative solutions listed in Table 9 were employed. The samples were stored at 2–5° C. for 11 days. The results are shown in Table 9.

TABLE 9

Evaluation of Various Concentrations of Preservative Solutions

| Concentration of Preservative Solutions | Appearance | Flavor | Texture | Moistness |
|---|---|---|---|---|
| 18.85% ascorbic acid, 7.87% calcium chloride, and 2% sodium hydroxide pH 3.38 | 3 | / | / | / |
| 12.57% ascorbic acid, 5.25% calcium chloride, and 1.33% sodium hydroxide pH 3.53 | 3 | / | / | / |
| 7.54% ascorbic acid, 3.15% calcium chldride, and 0.8% sodium hydroxide pH 3.67 | 4 | / | / | / |
| 4.71% ascorbic acid, 1.97% calcium chloride, and 0.5% sodium hydroxide pH 3.73 | 8 | 8.5 | 9 | 9.5 |
| 3.14% ascorbic acid, 1.31% calcium chloride, and 0.33% sodium hydroxide pH 3.83 | 9 | 9 | 9.5 | 9.5 |
| 2.48% ascorbic acid, 1.04% calcium chloride, and 0.26% sodium hydroxide pH 3.87 | 9.5 | 9 | 9.5 | 9.5 |
| 2.1% ascorbic acid, 0.87% calcium chloride, and 0.22% sodium hydroxide pH 3.90 | 9.5 | 9.0 | 9.5 | 9.5 |
| 1.64% ascorbic acid, 0.68% calcium chloride, and 0.17% sodium hydroxide pH 3.92 | 9.5 | 9.5 | 9.5 | 10 |
| 1.26% ascorbic acid, 0.52% calcium chloride, and 0.13% sodium hydroxide pH 3.95 | 8 | 9 | 8 | 7 |
| 0.82% ascorbic acid, 0.34% calcium chioride, and 0.09% sodium hydroxide pH 4.00 | 8 | 9 | 8 | 7 |
| Control | 8 | 9 | 7 | 7 |

*The scores for fresh cut were 10.

As can be seen in Table 9, the vegetable preservative preserved the flavor, texture, appearance and moistness of the vegetables in a certain range of each ingredient level.

EXAMPLE 10

Peppers were preserved as in Example 4, except the samples were packed with varying bags or package size as listed Table 10 for 13 or 14 days. The samples were stored at 2–5° C. The results are shown in Table 10.

TABLE 10

Effects of Different Package Sizes and Materials

| package materials | Pepper Samples | Appearance | Flavor | Texture | Moistness |
|---|---|---|---|---|---|
| 13 days storage time | | | | | |
| Cryovac PD900 bags | P | 9 | 9 | 8 | 8 |
| Cryovac B900 bags | P | 5 | 8 | 5 | 8 |
| Polyethylene 2 mil bags | P | 8 | 8 | 8 | 8 |
| Cryovac PD900 bags | C | 3 | / | / | / |
| 14 days storage | | | | | |
| Cryovac PD 900 bags | P | 9.5 | 9.5 | 9.5 | 9.5 |
| Cryovac PD961 bags | P | 9 | 9 | 9 | 8 |
| Cryovac PD900 bags | C | 8 | 9 | 8 | 5 |
| 14 days storage | | | | | |
| Cryovac PD900 bags* | P | 9.5 | 9 | 9.5 | 10 |
| Cryovac PD900 bags* | C | 8 | 9 | 8.5 | 7 |
| Cryovac PD900 bags | P | 9.5 | 9 | 9.5 | 10 |
| Double wall bags | P | 9 | 9 | 9.5 | 9.5 |
| Cryovac PD900 bags | C | 7.5 | 8.5 | 8 | 6 |

P - Preserved
C - Control
Bag size 0.5 lbs/bag except as noted by * which were 2.5 lbs/bag As can be seen in Table 10, the vegetable preservative preserved the flavor, texture, appearance and moistness of the vegetables at 13–14 days in a variety of packages.

EXAMPLE 11

Green bell peppers were treated as in Example 4, except with the following different preservative solutions listed in Table 11. The pepper slices were stored at 2–5° C. The results are shown in Table 11.

TABLE 11

Comparison of Appearance of Sliced Green Bell Peppers Treated with Vegetable Preservative to Peppers Treated with Other Comparative Preservatives

| | | Appearance | |
|---|---|---|---|
| Treatments | pH | 10 days | 14 days |
| comparative preservative: 1% citric acid, 1% calcium chloride and 0.36% sodium hydroxide | 3.9 | 8 | 5 |
| comparative preservative: 2% citric acid, 1% calcium chloride and 0.7% sodium hydroxide | 3.92 | 5 | 2 |
| comparative preservative: 3% citric acid, 1% calcium chloride and 0.95% sodium hydroxide | 3.89 | 5 | 2 |
| 2.48% ascorbic acid, 1.02% calcium chloride and 0.26% sodium hydroxide | 3.94 | 10 | 9 |
| Control | | 8 | 5 |

As shown in Table 11, peppers preserved with the preservative solutions employed in the present invention, maintained a better appearance than either the controls or the comparative preservative.

EXAMPLE 12

Peppers were preserved as in Example 4, except the samples were stored at 2–5° C. for 12 days. They were evaluated by compared to untreated products prepared by Ready Pac. (store at 2–5° C. for 8 days). Both the samples were spread on Cheese pizza and cooked at local pizza place. The results are shown in Table 12.

TABLE 12

Evaluation of Cooked Pepper Slices

| Pepper Sample | Appearance | Flavor | Texture | Moistness |
|---|---|---|---|---|
| Preserved | 7.5 | 7.33 | 8.08 | 7.3 |
| Control | 4.67 | 5.83 | 5 | 7.5 |

*without fresh cut control.

As can be seen in Table 12, the vegetable preservative preserved the flavor, texture, appearance and moistness of the vegetables at 12 days when then subsequently cooked.

EXAMPLE 13

Whole red onions were peeled, quartered, cored, and sliced. The onion slices were then dipped into 100 ppm sodium hypochlorite solution for 30 seconds, then drained and dried on paper towel for about five minutes. A portion of the onions were sealed in Cryovac PD900 bags as controls. The remainder of the onions were dipped into the preservative solutions listed in Table 13 for 2 minutes. The onions were removed from the solutions, drained and dried on paper towel for about 5 minutes Then the onions were sealed in Cryovac PD900 bags (200 g. in a 5"×8" bag) and stored at 2–5° C. for 14 days. The results are shown in Table 13.

TABLE 13

Evaluation of Sliced Red Onions Preserved with Preservative Solutions

| Preservative | Appearance | Flavor | Texture | Moistness |
|---|---|---|---|---|
| 2.48% ascorbic acid 2.5% calcium chloride, and 0.296% sodium hydroxide pH 3.91 | 10 | 10 | 10 | 10 |

TABLE 13-continued

Evaluation of Sliced Red Onions Preserved with Preservative Solutions

| Preservative | Appearance | Flavor | Texture | Moistness |
|---|---|---|---|---|
| 2.5% calcium chloride pH 9.87 | 8.5 | 9 | 9 | 8 |
| 3% ascorbic acid, 0.8% calcium carbonate pH 6.3 | 7.5 | 9 | 9 | 9 |
| Control | 6.5 | 7 | 6 | 5 |

*The scores for fresh cut were 10.

As can be seen in Table 13, the vegetable preservative preserved the flavor, texture, appearance and moistness of the onions at 14 days.

EXAMPLE 14

Whole tomatoes were washed and sliced. The tomato slices were then dipped into the preservative solutions listed in Table 13 for one minute. The tomatoes were removed from the solutions, drained and dried on a paper towel for about five minutes. The tomato slices were sealed in Cryovac PD900 bags and stored at 2–5° C. for 14 days. The results are shown in Table 14.

TABLE 14

Evaluation of Sliced Tomatoes Preserved with Various Preservative Solutions

| | Appearance | | Flavor | | Texture | |
|---|---|---|---|---|---|---|
| Preservative | 10 days | 14 days | 10 days | 14 days | 10 days | 14 days |
| 2.48% ascorbic acid, 1.04% calcium chloride, and 0.26% sodium hydroxide pH 4.05 | 10 | 8 | 9 | 9 | 9 | 8 |
| 2.48% ascorbic acid, 0.58% calcium chloride, and 0.31% calcium carbonate pH 4.03 | 10 | 8 | 8 | 8 | 8 | 7 |
| 3.0% calcium ascorbate pH 7.55 | 10 | 7 | 8 | / | 8 | / |
| 1% ascorbic acid, 0.3% calcium chloride, and 0.21% sodium hydroxide pH 5.25 | 10 | 5 | 8 | / | 8 | / |
| 2.48% ascorbic acid, 1.5% calcium chloride, and 0.27% sodium hydroxide pH 4.03 | 10 | 8 | 10 | 9 | 10 | 8 |
| 1% ascorbic acid, 1.5% calcium chloride, 0.083% sodium hydroxide, and 0.2% xanthen gum pH 3.8 | 10 | 7 | 7 | / | 5 | / |
| water control | 10 | 3 | 6 | / | 4 | / |

*The scores for fresh cut were 10.

As can be seen in Table 14, the vegetable preservative preserved the flavor, texture, and appearance of the tomatoes at 14 days.

EXAMPLE 15

Whole mushrooms were washed and sliced. The mushroom slices were then dipped into 100 ppm sodium hypochlorite solution for 30 seconds, then drained and dried on a paper towel for about 5 minutes. Some of them were sealed in Cryovac PD900 bags as control. The rest of the mushroom slices were then dipped into the solutions listed in Table 15, for one minute. The mushrooms were then drained and dried on a paper towel for about 5 minutes. The mushroom slices were sealed in Cryovac PD900 bags and stored at 2–5° C. for 11 days. The results are presented in Table 15.

TABLE 15

Evaluation of Sliced Mushrooms Treated with Different Preservative Solutions

| | Appearance | |
|---|---|---|
| Preservative | 4 days | 11 days |
| 3% calcium ascorbate | 8 | 7 |
| 2.48% ascorbic acid, 1.02% calcium chloride and 0.26% sodium hydroxide | 9 | yellow |
| Control | 6 | 5 |

*The scores for fresh cut were 10.

As can be seen in Table 15, the vegetable preservative preserved the appearance of the mushrooms as compared to the control for at 11 days for one preservative solution and at least for 4 days for another preservative solution.

EXAMPLE 16

Whole red potatoes were washed, peeled, and a portion of the potatoes were diced. The diced potatoes were then dipped into 3.8% calcium ascorbate solution from 2 minutes; controls potatoes were either dipped in water or not treated. The potatoes were drained, and either kept in jars with loose caps or sealed in Cryovac PD900 polyolefin bags and stored at 25° C. for one day. The whole potatoes were then diced. The potato samples were then boiled for 20 minutes. The untreated whole potatoes controls were washed, peeled, and diced before cooking as was a freshly cut control potato. The potatoes were then evaluated; the results are shown in Table 16.

TABLE 16

Evaluation of Potatoes with Different Treatments

| Preservative | Color | Flavor | Texture | Moistness |
|---|---|---|---|---|
| Peeled whole potatoes, stored in a jar | | | | |
| 3.8% Calcium Ascorbate | 12.0 | 12.8 | 13.2 | 13.0 |
| Tap Water | 11.0 | 11.8 | 12.6 | 13.2 |
| Untreated | 9.25 | 10.2 | 10.6 | 12.0 |
| Peeled and diced potatoes, stored in a jar | | | | |
| 3.8% Calcium Ascorbate | 6.75 | 11.0 | 12.0 | 12.75 |
| Tap Water | 6.50 | 7.4 | 10.2 | 8.2 |

TABLE 16-continued

Evaluation of Potatoes with Different Treatments

| Preservative | Color | Flavor | Texture | Moistness |
|---|---|---|---|---|
| Untreated Peeled and diced potatoes, stored in a bag | 4.5 | 6.0 | 9.4 | 6.8 |
| 3.8% Calcium Ascorbate | 14.25 | 10.4 | 10.2 | 11.8 |
| Tap Water | 12.5 | 9.0 | 10.2 | 10.8 |
| Untreated | 6.5 | 7.5 | 9.2 | 10.8 |
| Fresh cut control | 14.5 | 10.6 | 13.8 | 14.4 |

EXAMPLE 17

Whole red potatoes were washed and sliced. The slices were then dipped into the solutions listed in Table 17 or dipped into tap water for two minutes or not treated. The slices were drained and kept on open plates at 25° C. for up to 5 hours. The whiteness of the potatoes was evaluated and scored on scale of 1–15 with 15 being the maximum. A score of 8 is considered to be acceptable. The results are shown in Table 17.

TABLE 17

Evaluation of Whiteness of Preserved Potato Slices

| Preservative | 0 hr. | 1 hr. | 2 hr. | 3 hr. | 4 hr. | 5 hr. |
|---|---|---|---|---|---|---|
| 2.4% ascorbic acid 1.02% calcium chloride, 0.26% sodium hydroxide | 15 | 15 | 15 | 15 | 14 | 13 |
| 2.48% ascorbic acid, 0.58% calcium chloride, 0.31% calcium carbonate | 15 | 15 | 15 | 14 | 13 | 12 |
| Tap water control | 15 | 12 | 11 | 10 | 9 | 8 |
| Untreated control | 14 | 7 | 4 | 3 | 2 | 2 |

As can be seen in Table 15, the vegetable preservative prevented browning as compared to the control and the water control.

EXAMPLE 18

Whole cucumbers were washed and sliced. The cucumber slices were then dipped into the following solutions or tap water for about one minute. The slices were then removed from the preservative solutions, and drained for about five minutes. The cucumber slices were sealed in Cryovac PD900 bags and stored at 2–5° C. for 14 days. The results are shown in Table 18.

TABLE 18

Evaluation of Sliced Cucumbers Treated With Different Preservative Solutions

| Preservative | Appearance | | Flavor | | Texture | |
|---|---|---|---|---|---|---|
| | 10 days | 14 days | 10 days | 14 days | 10 days | 14 days |
| 2.48% ascorbic acid, 1.04% calcium chloride, 0.26% sodium hydroxide | 10 | 1 | 10 | / | 10 | 1 |
| 2.48% ascorbic acid, 0.58% calcium chloride, 0.31% calcium carbonate | 10 | / | 10 | / | 10 | / |
| 3.0% calcium ascorbate | 10 | / | 10 | / | 10 | / |
| 1% ascorbic acid, 0.3% calcium chloride, 0.21% sodium hydroxide | 10 | / | 10 | / | 10 | / |
| 2.48% ascorbic acid, 1.5% calcium chloride, 0.27% sodium hydroxide | 10 | 3 | 9 | / | 9 | 2 |
| Water control | 10 | / | 7 | / | 8 | / |

The scores for fresh cut were 10.

EXAMPLE 19

Cucumbers were preserved as in Example 18, except different preservative solutions, as listed in Table 19, were employed, and they were stored for 11 days instead of 14 days. The results are shown in Table 19.

TABLE 19

Evaluation of Sliced Cucumber Treated with Different Preservative Solutions

| Preservative | Appearance | | |
|---|---|---|---|
| | 4 days | 7 days | 11 days |
| 2.48% ascorbic acid, 1.02% calcium chloride, 0.26% sodium hydroxide | 10 | 8 | 3 |
| 2.48% ascorbic acid, 0.58% calcium chloride, 0.31% calcium carbonate | 10 | 7 | 2 |
| 2.48% ascorbic acid, 1.5% calcium chloride, 0.27% sodium hydroxide | 10 | 6 | 1 |
| 2.48% ascorbic acid, 2.5% calcium chloride, 0.296% sodium hydroxide | 10 | 6 | 3 |
| Control | 10 | 6 | 1 |

The scores for fresh cut were 10.

EXAMPLE 20

Whole heads of iceberg lettuce were washed and sliced. The lettuce slices were then dipped into 100 ppm sodium hypochlorite solution for about 30 seconds, then drained and dried on a paper towel for about five minutes. A portion of the lettuce slices were sealed in Cryovac PD900 bags as control. The rest of the lettuce slices were then dipped into the solutions listed in Table 20 for about one minute. The slices were then removed from the solutions, drained and dried on paper towels for about five minutes. The lettuce slices were sealed in Cryovac PD900 bags and stored at 2–5° C. for four days. The results are shown in Table 20.

TABLE 20

Evaluation of Sliced Lettuce
Treated with Different Preservative Solutions

| Preservative | Appearance |
| --- | --- |
| 3% calcium ascorbate | 7 |
| 2.48% ascorbic acid, 1.02% calcium chloride, 0.26% sodium hydroxide | 8 |
| Control | 8.5 |

Thus lettuce is a less preferred vegetable to treat with the method of preserving of the present invention.

What is claimed is:

1. A method for preserving fresh cut vegetables comprising the following steps:
   a. providing a preservative solution comprising:
      from about 0.1% to about 10% calcium ions;
      from 0.1 from about 30% ascorbate ions or erythorbate ions; and
      water; and
   b. applying said vegetable preservative to the cut vegetable wherein the preservative is essentially free of the metal sequestrant.

2. The method of claim 1, wherein the ascorbate ion is present from about 0.1% to about 20%, and the cut vegetable is stored at from about 0° C. to about 20° C., after step b.

3. The method of claim 2, wherein the preservative is essentially free of, film forming agents, sodium, and cysteine.

4. The method of claim 1, wherein the calcium ion is present from about 0.2 to about 3%.

5. The method of claim 1, wherein the preservative is essentially free of, film forming agents, sodium, and cysteine.

6. The method of claim 1, wherein the vegetable is a member of the Solcanaceae family, the Amaryllidaceae family, the Brassicaceae family, the Cucurbitaceae family, the Ascomycetes/Basidiomycetes classes.

7. The method of claim 1, wherein the preservative has a chloride ion concentration less than about 5%.

8. The method of claim 1, wherein the preservative solution comprises from about 0.5% to about 15% ascorbate ions or erythorbate ions; and the vegetable is a member of the Solcanaceae family, the Amaryllidacease family, the Brassicaceae family, the Cucurbitaceae family, the Ascomycetes classes.

9. The method of claim 1, wherein: the preservative solution comprises from about 0.2% to about 3% calcium ions, and from about 1% to about 5% ascorbate ions or erythorbate ions; the vegetable is selected from the group consisting of peppers, onion, tomatoes, cucumbers and mushrooms; and the cut vegetable is stored at from about 0° C. to about 20° C., after step b.

10. A method for preserving fresh cut vegetables consisting essentially of:
   from about 0.1 to about 10% calcium ions;
   from 0.1 to about 30% ascorbate or erythorbate ions; and,
   water.

11. The method of claim 10, wherein the vegetable preservative solution consisting essentially of:
   from about 0.1% to about 20% ascorbate ions or erythorbates ions; and
   water.

12. The method of claim 11, wherein the vegetable preservative solution consisting essentially of:
   from about 0.5% to about 15% ascorbate ions or erythorbates ions.

13. The vegetable preservative of claim 12, wherein the calcium ion is produced from calcium chloride or calcium carbonate or mixtures thereof.

14. The method of claim 13, wherein the vegetable retains over about 90% of moisture over about 11 days.

15. The method of claim 12, wherein the preservative is essentially free of, film forming agents, sodium, and cysteine.

16. The method of claim 12, wherein the vegetable is a member of the Solcanaceae family, or the Amaryllidaceae family.

17. The method of claim 12, wherein the vegetable is stored at from about 1° C. to about 7° C., the calcium ion is produced from calcium chloride or calcium carbonate or mixtures thereof, and the vegetable is selected from the group consisting of peppers, onion, tomatoes, cucumbers and mushrooms.

18. A method for preserving fresh cut vegetables comprising the following steps:
   a. providing a preservative solution consisting essentially of from about 0.1% to about 10% calcium ions,
      from 0.1 to about 30% ascorbate ions or erythorbate ions, and
      water; and
   b. applying said vegetable preservative to the cut vegetable.

19. A method of claim 18 wherein the calcium ion source is provided by calcium ascorbate or calcium erythorbate.

* * * * *